US010860806B2

(12) United States Patent
Shukla et al.

(10) Patent No.: US 10,860,806 B2
(45) Date of Patent: Dec. 8, 2020

(54) LEARNING AND CLASSIFYING WORKLOADS POWERED BY ENTERPRISE INFRASTRUCTURE

(71) Applicant: Dell Products L.P., Round Rock, TX (US)

(72) Inventors: Ravi Shukla, Bangalore (IN); Prakash Sridharan, Bangalore (IN); Bud Koch, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 76 days.

(21) Appl. No.: 16/047,206

(22) Filed: Jul. 27, 2018

(65) Prior Publication Data
US 2020/0034429 A1 Jan. 30, 2020

(51) Int. Cl.
*G06F 40/00* (2020.01)
*G06F 40/30* (2020.01)
*G06N 3/08* (2006.01)
*G06F 40/268* (2020.01)

(52) U.S. Cl.
CPC ............ *G06F 40/30* (2020.01); *G06N 3/08* (2013.01); *G06F 40/268* (2020.01)

(58) Field of Classification Search
CPC combination set(s) only.
See application file for complete search history.

(56) References Cited

U.S. PATENT DOCUMENTS

| 2018/0075368 | A1* | 3/2018 | Brennan | G06F 17/2785 |
| 2019/0130244 | A1* | 5/2019 | Mars | G06N 5/022 |

OTHER PUBLICATIONS

Ajit Rajasekharan, quora.com, What is doc2vec?, https://www.quora.com/What-is-doc2vec, updated Apr. 20, 2017.

\* cited by examiner

*Primary Examiner* — Vu B Hang
(74) *Attorney, Agent, or Firm* — Terrile, Cannatti & Chambers; Stephen A. Terrile

(57) ABSTRACT

A system, method, and computer-readable medium for performing a workload classification and analysis operation. The workload classification and analysis operation includes performing the steps of receiving workload data from a data source; generating a neural network model from the workload data; defining a plurality of workload signatures, the plurality of workload signatures defining a particular type of workload; identifying particular workloads using the plurality of workload signatures; and, providing information regarding the particular workloads to a user.

20 Claims, 11 Drawing Sheets

US 10,860,806 B2

LEARNING AND CLASSIFYING WORKLOADS POWERED BY ENTERPRISE INFRASTRUCTURE

BACKGROUND OF THE INVENTION

Field of the Invention

The present invention relates to information handling systems. More specifically, embodiments of the invention relate to learning and classifying workloads.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to combine a plurality of information handling systems into an information technology (IT) infrastructure such as an enterprise infrastructure. It is often desirable to learn and classify workloads executing within the IT infrastructure.

SUMMARY OF THE INVENTION

A system, method, and computer-readable medium for performing a workload classification and analysis operation. In certain embodiments, the workload classification and analysis operation uses a natural language processing (NLP) operation to identify workloads executing within the IT infrastructure. For the purposes of the present disclosure, an enterprise infrastructure may be defined as an IT information handling system environment for a specific organizational unit that is used to provide specific IT functionality for the organizational unit. It will be appreciated that the IT information handling system environment may include one or more information handling systems such as server type information handling system.

More specifically, in one embodiment the invention relates to a method for performing a workload classification operation, comprising: receiving workload data from a data source; generating a neural network model from the workload data; defining a plurality of workload signatures, the plurality of workload signatures defining a particular type of workload; identifying particular workloads using the plurality of workload signatures; and, providing information regarding the particular workloads to a user.

In another embodiment, the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: receiving workload data from a data source; generating a neural network model from the workload data; defining a plurality of workload signatures, the plurality of workload signatures defining a particular type of workload; identifying particular workloads using the plurality of workload signatures; and, providing information regarding the particular workloads to a user.

In another embodiment, the invention relates to a non-transitory, computer-readable storage medium embodying computer program code, the computer program code comprising computer executable instructions configured for: receiving workload data from a data source; generating a neural network model from the workload data; defining a plurality of workload signatures, the plurality of workload signatures defining a particular type of workload; identifying particular workloads using the plurality of workload signatures; and, providing information regarding the particular workloads to a user.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
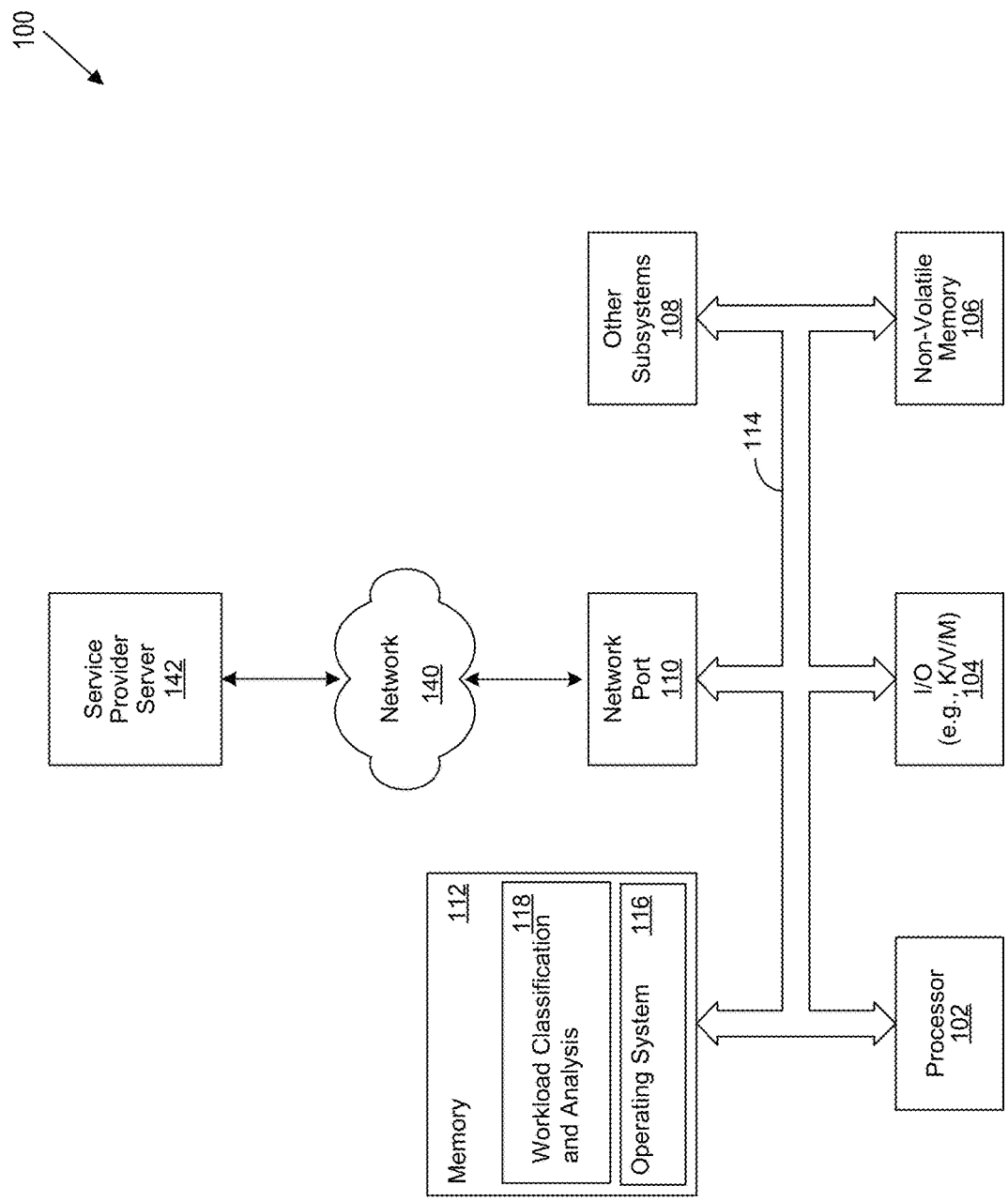
FIG. 1 shows a general illustration of components of an information handling system as implemented in the system and method of the present invention.

Various aspects of the present disclosure include an appreciation that one known approach for learning and classifying workloads is to perform a keyword based search on the IT infrastructure to identify and classify workloads executing within the IT infrastructure. Such a keyword based approach often requires manual interventions to ensure an up to date and accurate classification of the workloads.

Various aspects of the present disclosure include an appreciation that it is desirable for information handling system providers to have insights into workloads being executed within an IT infrastructure versus those that are executing in a cloud based infrastructure. Such insights enable the information handling system providers to strategize immediate business actions and also to plan future roadmaps for their products. Accordingly, an ability to classify workloads reliably from applications captured in server logs/product logs or free format text is an important aspect to these efforts. One example of a workload is a server type information handling system executing an application such as a virus and spyware protection service (e.g., the McAfee virus and spyware protection service). Using a workload classification and analysis operation this workload might be classified as a Security type of workload. Another example of a workload is a server type information handling system executing an analytics module (e.g., the Google analytics module v). Using a workload classification and analysis operation this workload might be classified as an Analytics type of workload.

Various aspects of the present disclosure include an appreciation that sales teams often have sparse visibility into how customers leverage the server infrastructure provided by an information handling system provider. Often the sales teams rely on customers reaching out for help before beginning a dialog regarding server upgrades. Sales teams typically learn about utilization of IT infrastructure only through conversations with customers. Enabling sales team members to learn about workloads executing in customer environments enables a sales team member to proactively intervene and can lead to insightful sales conversations with customers. Various aspects of the present disclosure include an appreciation that it would be desirable to enable ingestion of server log data to classify workloads. Various aspects of the present disclosure include an appreciation that it would be desirable to understand the relationship of workloads to server performance metrics.

Various aspects of the present disclosure include an appreciation that presently innovation in server and infrastructure products depend largely on visibility into current usage at Customer Data Centers. Specifically, while presently information handling system providers often rely upon internal testing in product development centers, an ability to obtain knowledge of actual workloads powered by server information handling systems can help engineers build best of the breed infrastructure to address customer workload needs with greater granularity. Often, a large effort is directed towards interviewing customers to learn about their workloads. It would be desirable to provide a reliable method for identifying and classify actual workloads within a customer's IT infrastructure.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a workload classification and analysis system 118.

The workload classification and analysis system 118 performs a workload classification and analysis operation. The workload classification and analysis operation improves processor efficiency (and thus the efficiency of the information handling system 100) by automatically classifying workloads executing on an information handling system. As will be appreciated, once the information handling system 100 is configured to perform the workload classification and analysis operation, the information handling system 100 becomes a specialized computing device specifically configured to perform the workload classification and analysis operation and is not a general purpose computing device. Moreover, the implementation of the workload classification and analysis operation on the information handling system 100 improves the functionality of the information handling system and provides a useful and concrete result of more quickly and efficiently classifying workloads than would be required without the workload classification and analysis operation.

In certain embodiments, the workload classification and analysis operation uses a natural language processing (NLP) operation to classify workloads and the workload analysis operation uses an NLP operation to identify workloads executing within the enterprise IT infrastructure. For the purposes of the present disclosure, an enterprise IT infrastructure may be defined as an IT information handling system environment for a specific organizational unit that is used to provide specific IT functionality for the organizational unit. It will be appreciated that the IT information handling system environment may include one or more information handling systems such as server type information handling system.

Figure 2:
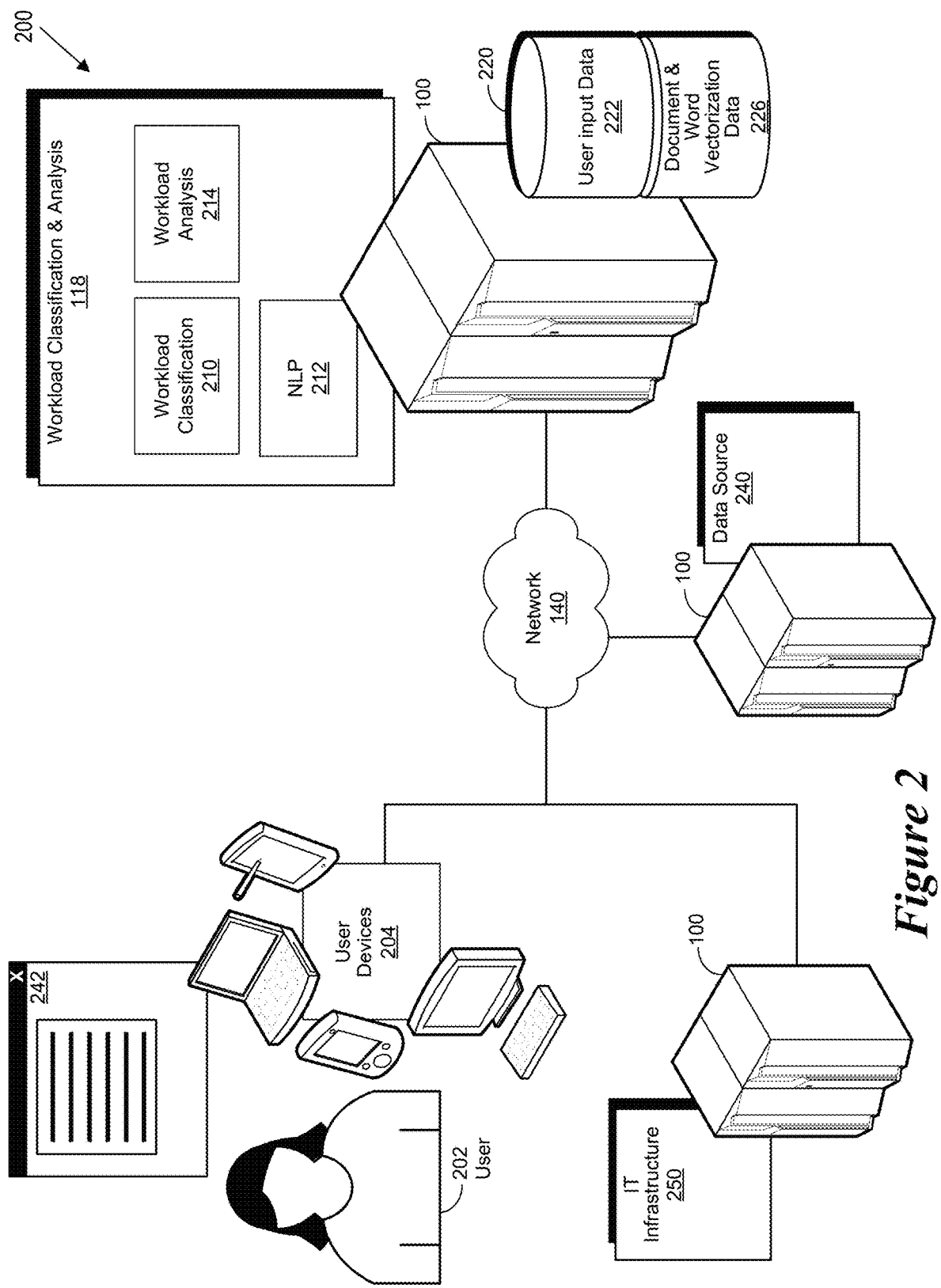
FIG. 2 shows a block diagram of a workload classification environment.

FIG. 2 is a block diagram of a workload classification and analysis environment 200 implemented in accordance with an embodiment of the invention. The workload classification and analysis environment 200 includes a workload classification and analysis system 118.

In various embodiments, a user 202 generates a workload classification query which is provided to the workload classification and analysis system 118. In various embodiments, a workload classification and analysis system 118 executes on a hardware processor of an information handling system 100. In these and other embodiments, the user 202 may use a user device 204 to interact with the workload classification and analysis system 118.

As used herein, a user device 204 refers to an information handling system such as a personal computer, a laptop computer, a tablet computer, a personal digital assistant (PDA), a smart phone, a mobile telephone, or other device that is capable of communicating and processing data. In various embodiments, the user device is configured to present a workload classification user interface 242. In various embodiments, the workload classification user interface 242 presents workload classification information. In various embodiments, the workload classification information is generated in response to a user query. In various embodiments, the user device 204 is used to exchange information between the user 202 and the workload analysis system 118 through the use of a network 140. In certain embodiments, the network 140 may be a public network, such as the Internet, a physical private network, a wireless network, a virtual private network (VPN), or any combination thereof. Skilled practitioners of the art will recognize that many such embodiments are possible and the foregoing is not intended to limit the spirit, scope or intent of the invention.

In various embodiments, the workload classification and analysis system 118 includes a workload classification module 210 which performs a workload classification and analysis operation. In various embodiments, the workload classification and analysis system 118 includes a natural language processing module 212 which performs a natural language processing operation. In various embodiments, the workload classification and analysis system 118 includes a workload analysis module 214 which performs a workload analysis operation. In various embodiments, the workload classification environment 200 includes a storage repository 220. The storage repository may be local to the system executing the workload classification and analysis system 118 or may be executed remotely. In various embodiments, the storage repository includes one or more of a user input data repository 222 and a document and word vectorization data repository 226.

In various embodiments, the workload classification and analysis system 118 interacts with a data source system 240 which may be executing on a separate information handling system 100. In various embodiments, the workload classification and analysis system 118 interacts with a customer IT infrastructure 250. In various embodiments, a workload user interface 242 may be presented via a website. In various embodiments, the website is provided by one or more of the workload classification and analysis system 118 and a website server (not shown).

For the purposes of this disclosure a website may be defined as a collection of related web pages which are identified with a common domain name and is published on at least one web server. A website may be accessible via a public internet protocol (IP) network or a private local network. A web page is a document which is accessible via a browser which displays the web page via a display device of an information handling system. In various embodiments, the web page also includes the file which causes the document to be presented via the browser. In various embodiments, the web page may comprise a static web page which is delivered exactly as stored and a dynamic web page which is generated by a web application that is driven by software that enhances the web page via user input to a web server.

In certain embodiments, the workload classification and analysis operation identifies clusters of keywords created from workload data obtained from the data source system 240. In certain embodiments, the workload data includes both structured data and unstructured data. In various embodiments the workload data includes internal and external structured and unstructured data. In certain embodiments, the workload classification and analysis operation applies a neural network model to the workload data. In certain embodiments the neural network model generates a vector space representation of documents and words within the workload data. In certain embodiments, the neural network model includes a doc2vec model. In certain embodiment, the doc2vec model includes an artificial neural network model which generates vector space representation of documents and words. Words and documents which are used in the same context are associated with the same cluster and are located close together in the vector space. Accordingly, using such a neural network model clusters words and documents used in similar context using a vector space representation.

In certain embodiments, the workload NLP operation is a neural network based NLP operation. In certain embodiments, the identified workloads are classified by type. In certain embodiments, the neural network based NLP operation includes a training operation. In certain embodiments, the training operation trains the neural network model using knowledge source such as one or more of a customer relationship management (CRM) knowledge source, a sales force dot com (SFDC) knowledge source and an external knowledge source such as a Wikipedia knowledge source.

In certain embodiments, the workload classification and analysis operation predicts a type of workload from free format text description in a CRM data source. In certain embodiments, the workload classification and analysis operation predicts a type of workload by analyzing application names from product logs of the IT infrastructure. In certain embodiments, the workload classification and analysis operation performs the prediction by using workload signatures. A workload generally refers to a kind (i.e., type) of data processing that an information handling system has been configured to perform at a given time. More specifically, for the purposes of this disclosure a workload may be defined as a kind of application (or applications) executing on an IT infrastructure at a given time along with a number of users or processes connected to and interacting with the application. For the purposes of this disclosure, a workload signature may be defined as a set of characteristics (described by a set of words) associated with a workload at a particular point in time.

In various embodiments, the workload classification and analysis operation receives as an input either an opportunity description text in a data source such as CRM data source or a SFDC data source or an application name (i.e., application executing on the information handling system) from product logs. The workload classification and analysis operation then provides the input to a neural network model. The neural network model then predicts the kind of workload executing on the server. In certain embodiments, the workload classification and analysis operation uses using neural network representations of workload signatures (set of words which can be added or subtracted in vector space to represent a workload). By using workload signatures, the workload classification and analysis operation is intuitive to understand and can be used to improve accuracy of workload classification.

In various embodiments, the workload classification and analysis operation leverages unstructured data sources describing data center workloads and applications powering the workloads to classify the workloads. In certain embodiments, the unstructured data can include one or more of internal data sources (e.g., CRM data sources and/or SFDC data sources) and external sources (e.g., Wikipedia, International Data Corporation (IDC) reports, product websites). Thus, the workload classification and analysis operation does not require any pre labelled data frames to perform the classification operation.

In various embodiments, the workload classification and analysis operation adapts to polymorphic server logs: More specifically, application information from servers can come in the form of text based logs or structured data frames for classification. The application information is provided as is to the workload classification and analysis operation to perform the classifications without the need for any intermediate data structuring.

In various embodiments, the workload classification and analysis operation minimizes human intervention: Many known classification methods involve precise text string matching needing manual effort to setup a reference string dataset for search. For example, one manual process manually searches for the keyword "sql" within the input text and classifies matches as "data management" and the applications corresponding to the match as data management applications. If data identified during the manual process does not match the keyword "sql," the data is often unclassified and the process would need to be manually provided additional keywords for classification. Also as new applications become available additional effort is needed to rebuild the dataset. The current workload classification and analysis operation obtain information directly from data sources such as a web site and uses the information to automatically refresh the classification operation with minimal human intervention.

In various embodiments, the workload classification and analysis operation scales and integrates on demand. More specifically, the workload classification and analysis operation can ingest newer server logs on demand. Additionally, the workload classification and analysis operation can be integrated with applications such as salesforce application to help facilitate impactful customer conversations. In certain embodiments, the workload classification and analysis operation can be integrated into a sales assistant application to assist in generating intelligent customer proposals for use by the salespeople interacting with the sales assistant application. In certain embodiments, the workload classification and analysis operation may be exposed directly to customers as a self-service engine. In various embodiments, the workload classification and analysis operation integrates with other application areas such as product engineering to facilitate provision of interesting insights to a product engineering function.

Figure 3:
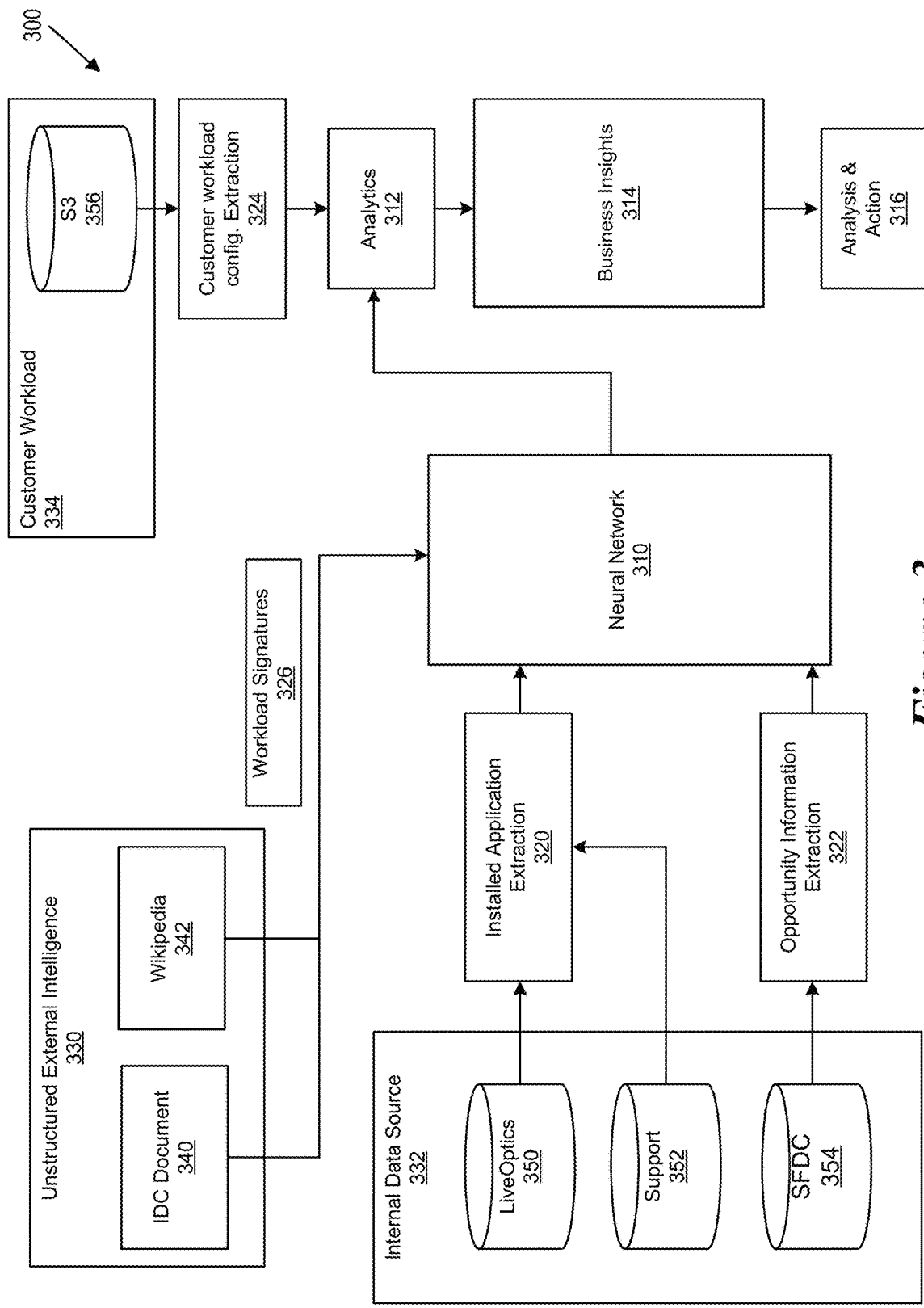
FIG. 3 shows a functional block diagram of a workload classification environment.

Referring to FIG. 3, a functional block diagram of a workload classification environment 300 is shown. The workload classification and analysis system 118 includes a neural network component 310, a workload analytics component 312, a business insight component 314 and an analysis and action component 316. The neural network component 310 mines and creates word and document cluster neighborhoods from one or more data sources. The neural network component 310 can use the word and document cluster neighborhoods to identify workloads. The analytics component 312 applies a neural network model to vector representations of the workload signatures to identify workload types executing within an IT infrastructure. The business insight component 314 provides actionable insights for business based upon the workload classifications. For example, the actionable insights might provide country level actionable insights. The actionable insights might include customer workload distributions that include time based shifts. The actionable insights might include server performance metrics by workload. The actionable insights might identify configurations associated with each classified workload.

In various embodiments, the workload classification and analysis system 118 also includes one or more of an installed application extraction module 320, an opportunity information extraction module 322, a customer workload configuration extraction module 324 and a workload signature extraction module 326. The workload classification environment 300 further includes one or more of unstructured external intelligence information 330, internal data source information 332 and customer workload information 334. In various embodiments, the unstructured external intelligence information 330 includes one or more of IDC document information 340 and Wikipedia information 342. In various embodiments, the internal data source information includes post purchase information handling system telemetry information stored within a information handling system telemetry information (LiveOptics) repository 350, support information stored within a support repository 352 (e.g., SupportAssist) and opportunity information stored within a SFDC repository 354. In various embodiments, the customer workload information 334 includes information regarding information handling system configurations within a customer IT infrastructure used when executing customer workloads stored within an as sold information handling system configuration (S3) repository 356.

For the purposes of this disclosure, support information includes data from a monitoring agent such as the Dell SupportAssist monitoring agent available from Dell Computer, Inc. The monitoring agent captures system performance information periodically from IT infrastructure systems. In various embodiments, the system performance information includes names of applications executing on the system as well. The workload classification system can use the system performance information as an input). For the purposes of this disclosure, opportunity information includes information obtained from an SFDC data source. In various embodiments, the SFDC data source includes an opportunity field. In certain embodiments, the opportunity field includes a raw text field which provides information on what kind of opportunity is available in a new deal. For example, for a sales person wishing to pitch company products to a certain customer that is executing "tensorflow" based analytics models, then the opportunity field might include raw text which sets forth "to sell hardware for a client running tensorflow based deep learning models." This opportunity information could then be provided to the workload classification and analysis system 118.

The installed application extraction module 320 extracts installed application information from the information handling system telemetry information repository 350 and support and/or system performance monitoring information from the support repository 352. The opportunity information extraction module 322 extracts opportunity information from the SFDC repository 354. The customer workload configuration extraction module 324 extracts customer information handling system configuration information from the as sold information handling system configuration repository 356. The workload signature extraction module 326 generates workload signatures and applies a neural network model to vector representations of the workload signatures to identify workload types.

Figure 4:
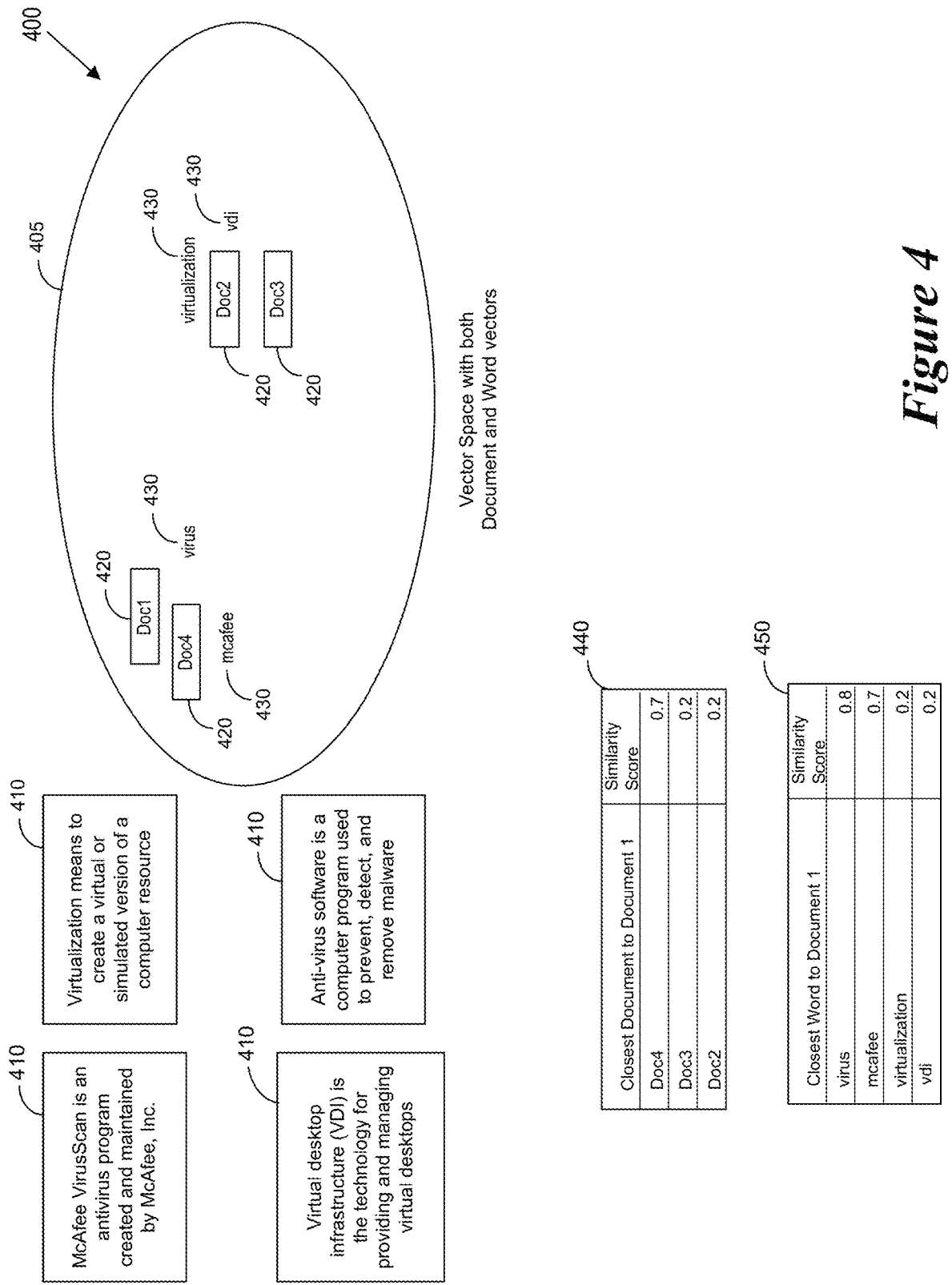
FIG. 4 shows a block diagram of an example Doc2vec model.

Referring to FIG. 4, a block diagram of an example Doc2vec neural network model is shown. More specifically, a doc2vec model 405 receives a plurality of input documents 410 (Doc1, Doc2, Doc3, Doc4). The Doc2vec neural network model 405 then converts each of the plurality of input documents to vectors, and words within each of the documents to vectors (i.e., document vectors and word vectors). More specifically, the Doc2vec neural network model uses the input documents 410 to generate a document vector 420 is generated for each document (Doc1 document vector, Doc2 document vector, Doc3 document vector and Doc4 document vector). The Doc2vec neural network model also uses the input documents 410 to generate word vectors 430 (e.g., a "Virus" word vector, a "mcafee" word vector, a "virtualization" word vector and a "vdi" word vector).

The vectors generated by the neural network model 405 can then be used to identify similarities such as similarities between various documents as well as similarities between words and documents. Continuing the example shown, the neural network model 405 can identify which document is closest to document 1 by generating similarity scores between each of the vectors (see e.g., table 440). The neural network model 405 can also identify which word is closest to the overall content of document 1 (see e.g., table 450).

Figure 5:
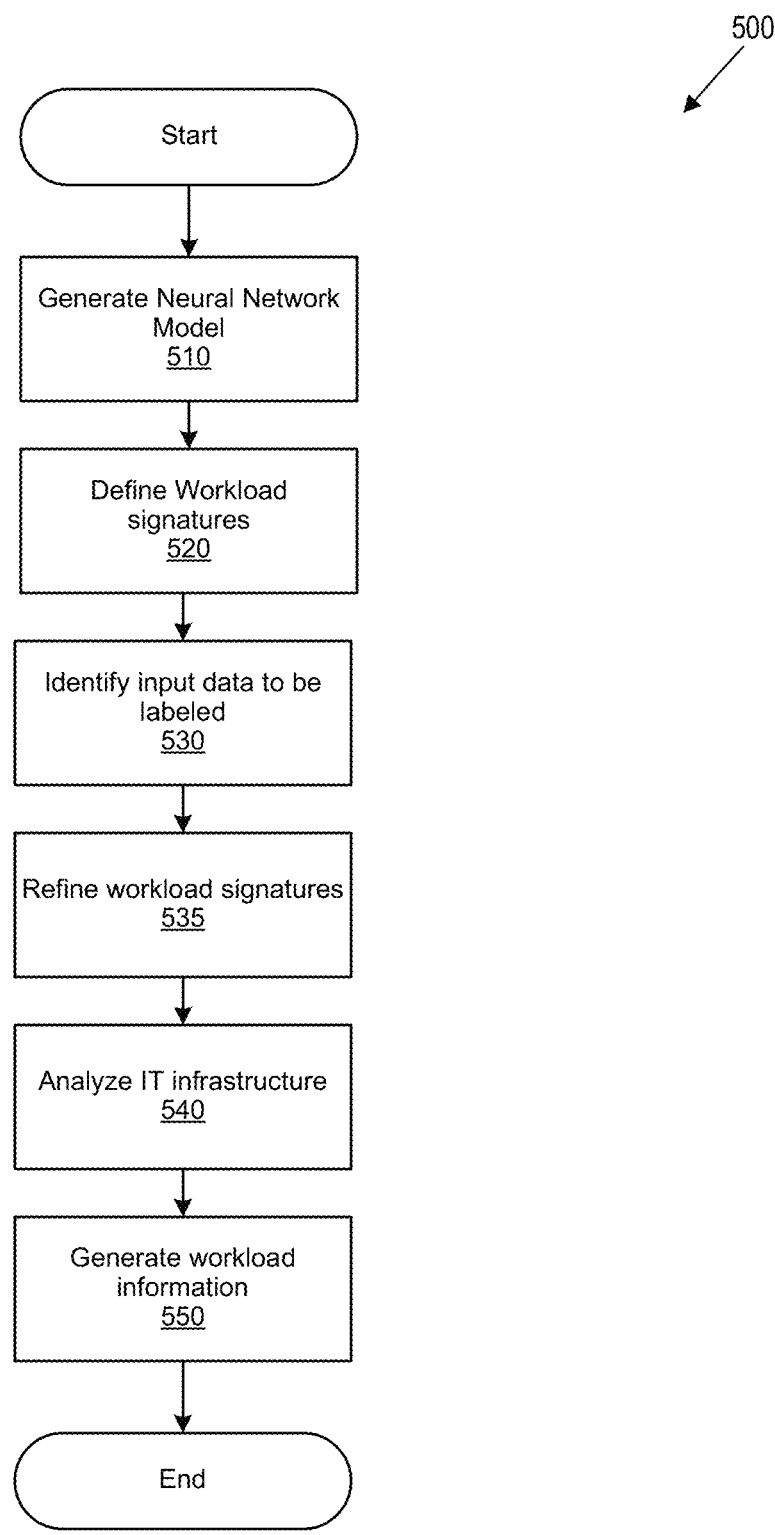
FIG. 5 shows a flow chart of a workload classification and analysis operation.

Referring to FIG. 5, a flow chart of a workload classification and analysis operation 500 is shown. More specifically, the workload classification and analysis operation starts at step 510 by generating a neural network model. In certain embodiments, the neural network model is generated using at least one of unstructured external data sources and internal data sources. In various embodiments, the unstructured data comprises one or more of IDC type data sources, Wikipedia type data sources as well as other workload related knowledge sources. In various embodiments, the unstructured data sources include data from at least one of a plurality of categories. In various embodiments the plurality of categories include a server (computing) category, a collaborative software category, a content management systems category, an enterprise resource planning (ERP) software category, a supply chain management category, a customer relationship management category, a data management category, an analytics category, an application software category, a network management category, a computer security software category, an identity management category, a computer network security category, an internet security category, a systems management category, a workload scheduling category, a configuration management category, an information technology management category, a centralized computing category, a streaming media systems category, a web server software category, a computer-aided engineering category, a desktop virtualization category, a list of concurrent and parallel programming languages category, a parallel computing category, a database management systems category, a spreadsheet software category, a desktop publishing software category, a workflow management system category, a computer-aided design category, a list of ERP software packages category, a comparison of relational database management systems category, a comparison of integrated development environments category, a comparison of time-tracking software category, and a comparison of project management software category. Various aspects of the present disclosure include an appreciation that the use of external data sources, such as external unstructured data sources, when generating a neural network model for classifying workloads greatly increases the breadth and usefulness of the neural network model for use in analyzing IT infrastructure workloads In certain embodiments, the neural network model is generated using a vector space generation neural network model such as a doc2vec type model. The vector space generation neural network model generates a vector space representation of words within a collection of keywords. In certain embodiments, the vector space generation neural network model comprises a document vector space representation generation type model such as a distributed bag of words (dbow) type doc2vec model. The vector space generation neural network model generates a vector representation of documents as well as words. With the vector representation of documents, documents which are used in the same context are represented as close within vector space compared with documents which are not used in a same context.

Next, at step 520, the workload classification and analysis system 118 defines a plurality of workload signatures. A workload signature comprises a neural network representation of a set of keywords which define a particular kind of workload. The neural network representation can be generated by adding or subtracting the vector representation of individual words.

One example of how a signature may be defined is when the neural network representation of the vector of word "American" is added with a representation of the vector of the word "Pop," the workload analysis system would produce a vector which is very close to vector representation of a famous American singer such as "Lady Gaga." This neural network representation would be generated as:

Vector("American")+Vector("Pop")=Vector("Lady Gaga").

An example of how a workload signature may be defined is when the neural network representation of the vector of the word "client" is added with the representation of the vector of the words "virtualization" and "software application." This neural network representation would be generated as:

Vector("client)+Vector("virtualization")+Vector("software application")=Vector(client virtualization").

A workload signature may also be defined using a negative neural network representation. In this case, the neural network representation is subtracted from the signature.

As an example, a signature may be defined where the neural network representation of the vector of a word of a known pop star (e.g., "Lady Gaga") is added with a representation of the vector of a geographic location (e.g., "Japanese") minus a representation of another geographic location (e.g., "American"). Such a signature would produce a vector which represents a Japanese pop star. This neural network representation would be generated as:

Vector ("Lady Gaga")+Vector("Japanese")–Vector ("American")=Vector("Ayumi Hamasaki").

Similarly if in a particular workload analysis, it is desirable to exclude a certain type of software application, then a vector representation of that application could be subtracted from the workload signature. For example, if when performing a workload analysis of a "collaboration and communication" workload, it is desired to exclude a skype type of application, then the workload signature may be defined as a vector representation of "collaboration" added with a vector representation of "communication" minus a vector representation of "skype." This neural network representation would be generated as:

Vector("collaboration")+vector("communicate")−vector("skype")=signature(collaboration and communication)

Next, at step 530, the workload classification and analysis system 118 identifies valid input data to be labeled. In certain embodiments, the input data is labeled using a machine learning operation. In certain embodiments, the machine learning operation includes a support vector machine (SVM) machine learning operation.

Next at step 535, the workload analysis system refines the workload signatures. More specifically, the output accuracy of the workload analysis system may be improved by changing signature words used within the workload signatures. For the purposes of this disclosure, signature words may be defined as words which can be added or subtracted in vector space to a set of words to represent a workload. For example, in a certain implementation, a business does not wish to treat "sql" as a "Data management" kind of workload, then the workload analysis system can subtract the vector representation of "sql" from workload signature definition of "data management."

Next, at step 540, the workload classification and analysis system 118 analyzes an IT infrastructure (e.g., IT infrastructure 250) using the workload signatures. When analyzing the IT infrastructure, the workload classification and analysis system 118 applies a neural network model to vector representations of the workload signatures to identify workload types executing within an IT infrastructure.

Next, at step 550, the workload classification and analysis system 118 generates information regarding the workload or workloads of a particular IT infrastructure. The information regarding the workload or workloads of a particular IT infrastructure facilitate an understanding of which workloads are being executed within the particular IT infrastructure and which workloads are being executed remotely (e.g., in the cloud). Additionally, the information regarding the workload or workloads of a particular IT infrastructure facilitate an analysis of performance of the particular IT infrastructure when compared with other IT infrastructures executing a similar workload or workloads. The information regarding the workload of the particular IT infrastructure may be provided to a user via the workload classification user interface 242.

Figure 6:
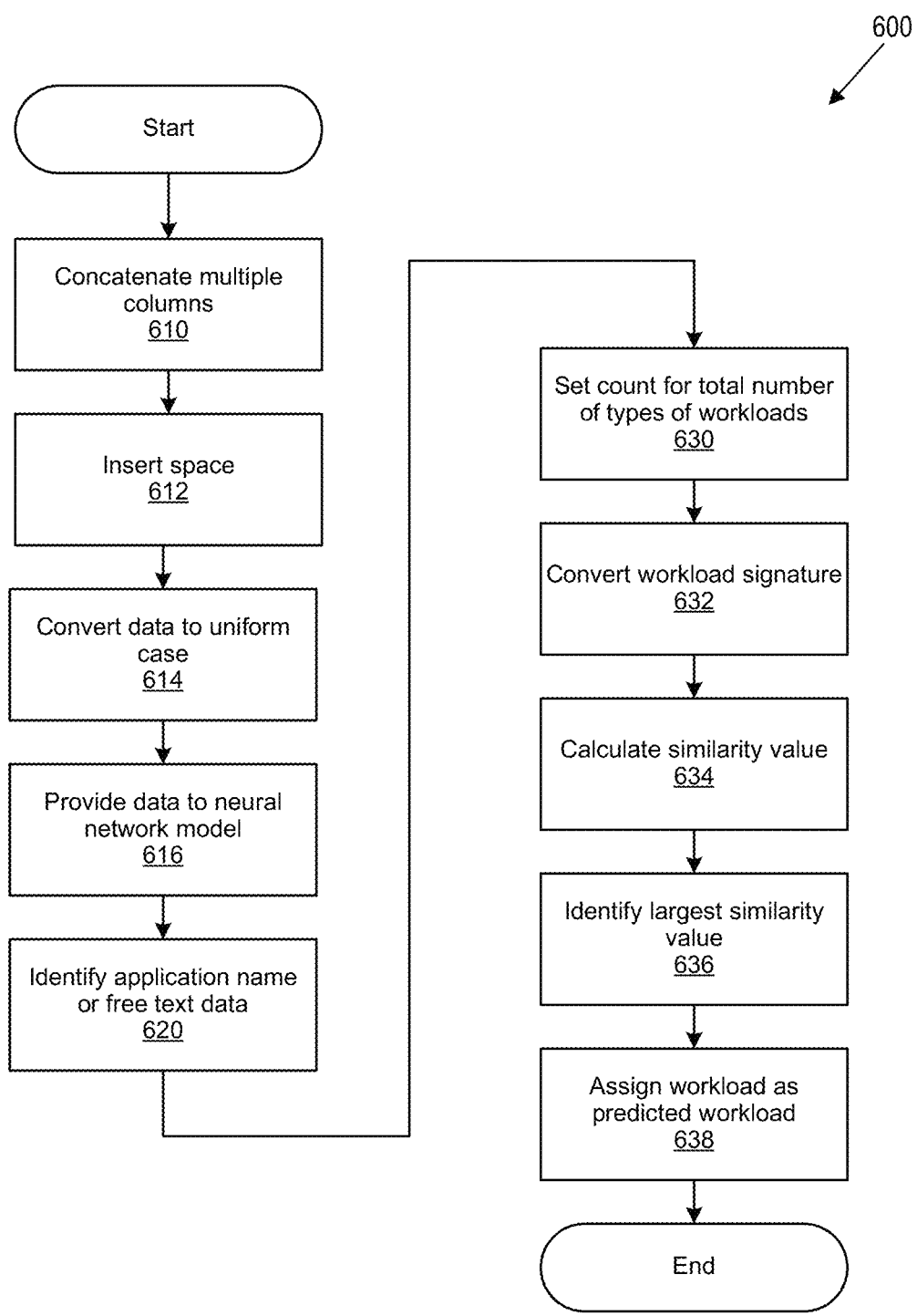
FIG. 6 shows a flow chart of a structured data preparation operation.

Referring to FIG. 6, a flow chart of a structured data (e.g., SFDC data) preparation operation 600 is shown. More specifically, when preparing structured data for running the doc2vec model the structured operation 600 starts by preparing the structured data so that a neural network analysis may be applied to the data. More specifically, at step 610, the workload classification module 210 concatenates multiple columns from structured data such as SFDC data. In various embodiments, the multiple columns include columns having free text which can provide information which is useful when identifying a workload. In various embodiments, the columns include one or more of an opportunity_name column, an opportunity_text column, an application_name column and a product_name column. Additionally, in certain embodiments, the columns can further include a workload_type column. In certain embodiments the workload_type column is manually populated. More specifically, the opportunity_name column stores information regarding a given name of an opportunity (e.g., "UT Austin Tensor flow setup"), the opportunity_text column stores information regarding an opportunity (e.g., "UT Austin is looking for hardware to run deep learning models using Tensorflow"), the application_name column stores information regarding the name of an application which will execute on the information handling system purchased by a customer. The workload_type column stores information regarding a type of workload to be executed on the information handling system purchased by a customer. Often the workload_type field is empty; however, the workload_type field can be filled by performing a keyword search within the opportunity text.

Next, at step 612 a space is inserted between each concatenated field. The space is inserted because it is desirable that the concatenated field include proper words that may be used by the neural network model (e.g., a concatenated field includes a field 1 value of "antivirus" and a field 2 value of "hardware for running security software." Next at step 614, the SFDC preparation operation 600 converts all concatenated data into a uniform case (e.g., to lower case). Next, at step 616, the prepared data is provided to the neural network model. In certain embodiments, each concatenated entry is treated as a single document.

Next, the data to be labeled is identified. More specifically, at step 620, an application name or free text data (such as SFDC data) is identified from product logs. Next at step 630 a count (j) is set for a total number of types of workloads. Next at step 632, each workload signature is converted to converted workload signature set forth as a vector sum or subtraction of its constituent components (identified as wl[j]). Next at step 634, for each workload type (j), a similarity value (identified as similarity[j]) between the converted workload signature (wl[j]) and a vector representation of the application is calculated. In certain embodiments, the similarity value is calculated by inferring a nearest vector to the application name. In certain embodiments, the similarity value may be defined as:

similarity[j]=1−spatial.distance.cosine(wl[j], model.infer_vector(app.split( ),steps=x,alpha=y))

where x and y are iteratively learned to increase the accuracy of the similarity value.

Next, at step 636, the largest similarity value is identified. Next, at step 638, the value of workload as identified by the count corresponding to the largest similarity value is assigned as the predicted workload.

Figure 7:
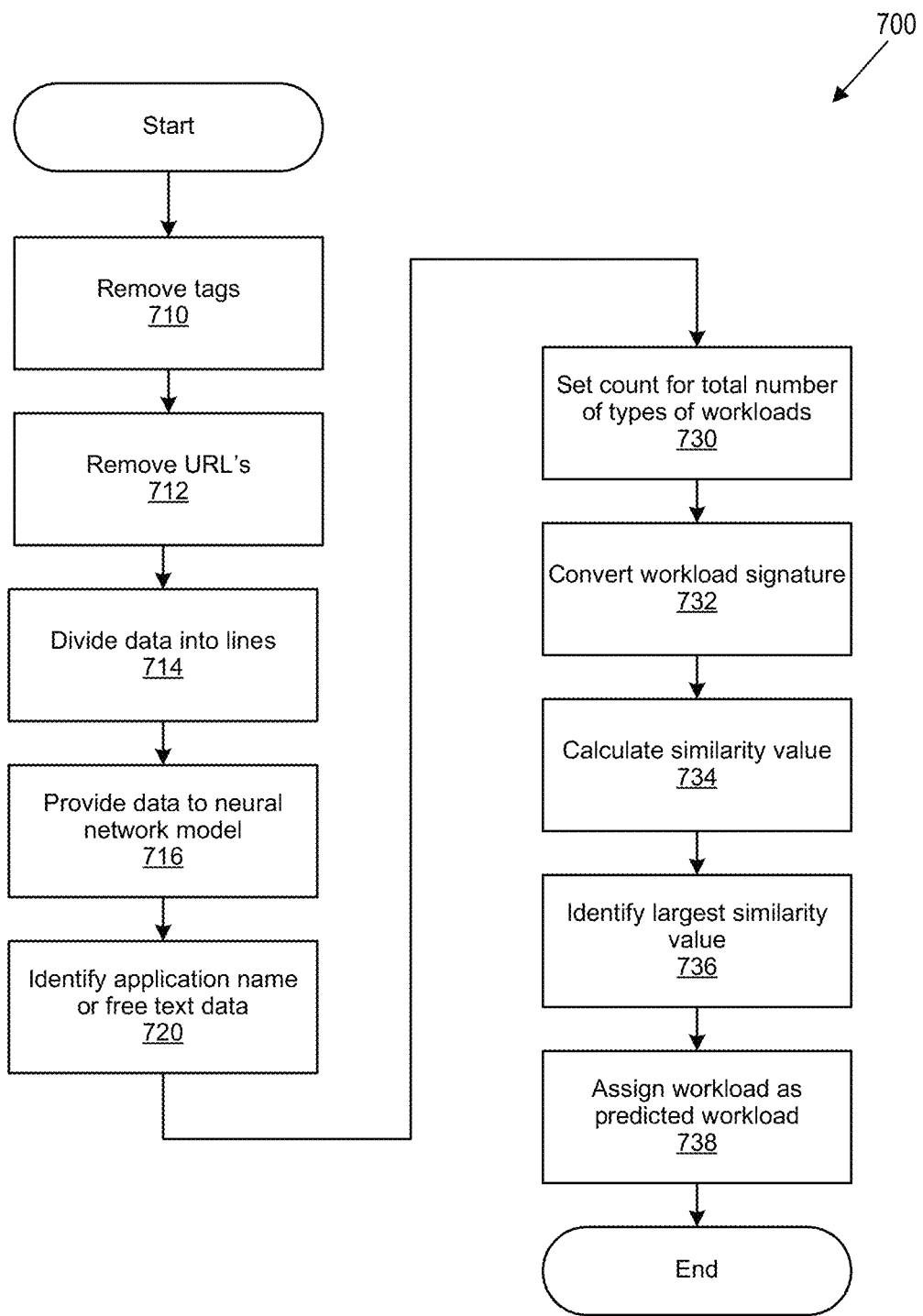
FIG. 7 shows a flow chart of an unstructured data source preparation operation.

Referring to FIG. 7, a flow chart of an unstructured data source preparation operation 700 is shown. More specifically, when preparing unstructured data (such as Wikipedia data) for running the doc2vec model, an unstructured data source preparation operation 700 starts by preparing the unstructured data so that a neural network analysis may be applied to the data. More specifically, at step 710, the unstructured data source preparation operation removes tags (such as xml tags) from the unstructured data. Next at step 712, the unstructured data source preparation operation removes universal resource locators (urls) and stop words from the unstructured data. For the purposes of this disclosure stop words may be defined as non-important keywords (i.e., words that do not add to the content of the document such as a, an, is, the etc.) within a document. Next, at step 714, the unstructured data source preparation operation divides data within the document into lines based upon full stops. For the purposes of this disclosure a full stop is used to represent a complete concept within a document via a punctuation mark such as a period, a comma, a paragraph return, etc. Next at step 716, the unstructured data source preparation operation provides the lines of data to the neural network model.

Next, the data to be labeled is identified. More specifically, at step 720, an application name or free text data (such as SFDC data) is identified. Next at step 730 a count (j) is set for a total number of types of workloads. Next at step 732, each workload signature is converted to converted workload signature set forth as a vector sum or subtraction of its constituent components (identified as wl[j]). Next at step 734, for each workload type (j), a similarity value (identified as similarity[j]) between the converted workload signature (wl[j]) and a vector representation of the application is calculated. In certain embodiments, the similarity value is calculated by inferring a nearest vector to the free text. In certain embodiments, the similarity value may be defined as:

similarity[j]=1−spatial.distance.cosine(wl[j], model.infer_vector(sfdc_text.split( ), steps=x,alpha=y))

where x and y are iteratively learned to increase the accuracy of the similarity value.

Next, at step 736, the largest similarity value is identified. Next, at step 738, the value of workload as identified by the count corresponding to the largest similarity value is assigned as the predicted workload.

Figure 8:
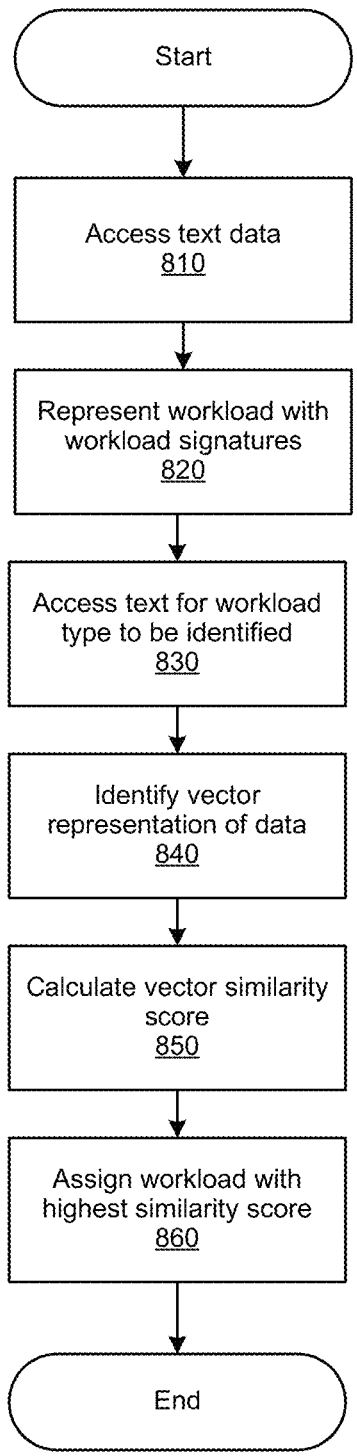
FIG. 8 shows a flow chart of a workload classification and analysis operation.

Referring to FIG. 8, a flow chart of a workload classification and analysis operation 800 is shown. When performing a workload classification and analysis operation, the workload classification and analysis system 118 enables a user to identify workloads of interest within a customer IT environment. In various embodiments, the workloads of interest can include one or more of Big Data workloads, in-memory workloads, structured workloads, business application workloads, high performance computing (HPC) workloads, software defined storage (SDS) workloads, data center (DC) virtualization workloads, virtual desktop infrastructure (VDI) workloads and infrastructure workloads. Structured workloads relate to a type of application workload which interact with structured (i.e., tabular) data. Infrastructure workloads relate to a type of application workload relating to information handling system infrastructure. Often infrastructure type application workloads are used for sharing information and may be stored within and executed by a spreadsheet type application (e.g., an Excel application) or a collaborative type application (e.g., a Sharepoint application).

The workload classification and analysis system 118 uses one or more data sources to identify workloads of interest. For example, a user might be interested in obtaining information regarding how three workload types, a virtualization workload type, a Big Data workload type and a structured workload type, are being used within a customer IT environment. The workload classification and analysis operation 800 begins with the user accessing free format text data from customer specific SFDC customer data sources or other customer touchpoint data sources (i.e., a data source containing customer workload related information) at step 810. Next, the user represents each workload with one or more workload signatures at step 820. The workload signatures are represented using vector representations of words identified using non-structured data sources such as Wikipedia data sources or general SFDC data or using business rules. The workload signatures for the workloads of interest might be set forth as:

Signature(Big Data)=[vector["big"]+vector["date"]+vector["complex"]+vector["voluminous"]+vector["hadoop"]+vector["distributed"]+vector["processing"]+vector["mapreduce"]]

Signature(InMemory)=[vector["inmemory"]+vector["ram"]+vector["real"]+vector["time"]+vector["analytics"]]

Signature(Structured)=[vector["structured"]+vector["olap"]+vector["sql"]+vector["data"]+vector["processing"]]

Signature(Business Apps)=[vector["oltp"]+vector["transactional"]+vector["crm"]+vector["erm"]+vector["hrm"]+vector["erp"]+vector["scm"]+vector["apps"]]

Signature(HPC)=[vector["high"]+vector["performance"]+vector["computing"]+vector["super"]+vector["computer"]+vector["parallel"]]

Signature(SDS)=[vector["software"]+vector["defined"]+vector["storage"]+vector["virtualization"]]

Signature(DC Virtualization)=[vector["datacenter"]+vector["virtualization"]+vector["enterprise"]]

Signature(VDI)=[vector["client"]+vector["virtualization"]]

Signature(Infrastructure)=[vector["develop"]+vector["test"]+vector["print"]+vector["file"]+vector["communicate"]+vector["share"]+vector["collaborate"]]

Next, at step 830, the workload classification and analysis system 118 accesses the free format text for which the workload type is to be identified. For example, the workload type to be identified might be described as "a particular bank wants suitable hardware to setup a Hadoop infrastructure."

Next, at step 840, the user accesses the workload classification and analysis system 118 to identify a vector representation of free format text using a previously generated neural network model. For example, the vector representation may be set forth as:

Vector (free text)=Vector ("particular bank wants suitable hardware to setup Hadoop infrastructure")

Next, at step 850 the workload classification and analysis system 118 calculates a vector similarity score between the vector representation of free format text and each of the workload signatures. In certain embodiments, the vector similarity score represents a distance between the vectors. In certain embodiments, the vector similarity score corresponds to the similarity value. In this particular example, the similarity scores might be:

Similarity between Signature(Big Data) & Vector (free text)=0.426

Similarity between Signature(InMemory) & Vector (free text)=0.398

Similarity between Signature(HPC) & Vector (free text)=0.394

Similarity between Signature(Structured) & Vector (free text)=0.388

Similarity between Signature(Business Apps) & Vector (free text)=0.365

Similarity between Signature(SDS) & Vector (free text)=0.361

Similarity between Signature(DC Virtualization) & Vector (free text)=0.327

Similarity between Signature(VDI) & Vector (free text)=0.285

Similarity between Signature(Infrastructure) & Vector (free text)=0.0

Next, at step 860, the workload classification and analysis system 118 assigns the workload with the highest similarity score to the free text. In this case the workload type for "particular bank wants suitable hardware to setup Hadoop infrastructure" is "Big Data" due to highest similarity score of 0.426.

Figure 9:
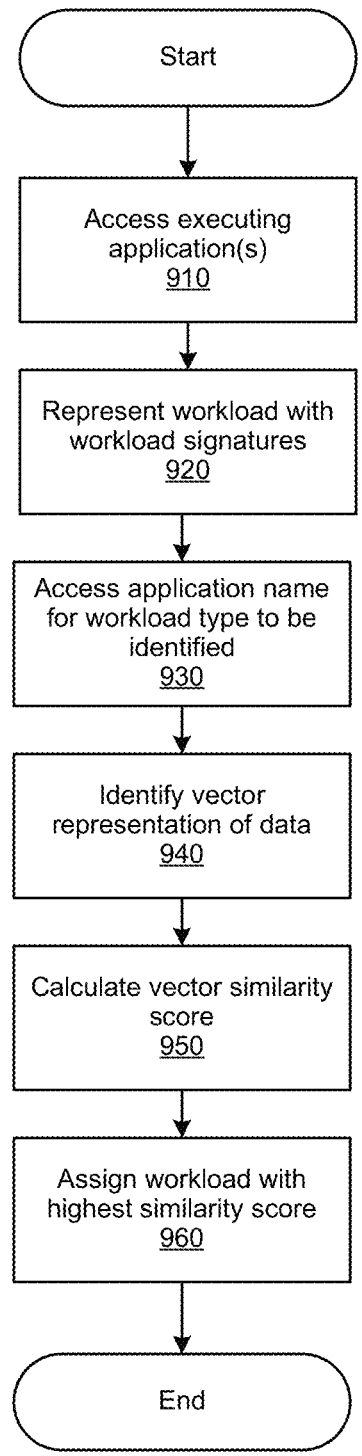
FIG. 9 shows a flow chart of a workload classification and analysis operation.

Referring to FIG. 9, a flow chart of a workload classification and analysis operation 900 is shown. When performing the workload classification and analysis operation 900, the workload classification and analysis system 118 enables a user to identify workloads of interest within a customer IT environment. The workload classification and analysis system 118 uses one or more data sources to identify workloads of interest. In various embodiments, the workloads of interest can include one or more of Big Data workloads, in memory workloads, structured workloads, business application workloads, high performance computing (HPC) workloads, software defined storage (SDS) workloads, data center (DC) virtualization workloads, virtual desktop infrastructure (VDI) workloads and infrastructure workloads.

The workload classification and analysis operation 900 begins with the user accessing application name data (which may be obtained by identifying applications executing within the customer IT infrastructure) at step 910. Next, the user represents each workload by a workload signature at step 920. The workload signatures are represented using vector representations of words identified using non-structured data sources such as Wikipedia data sources or general SFDC data or using business rules. The workload signatures for the workloads of interest might be set forth as:

Signature(Big Data)=[vector["big"]+vector["data"]+vector["complex"]+vector["voluminous"]+vector["hadoop"]+vector["distributed"]+vector["processing"]+vector["mapreduce"]]

Signature(InMemory)=[vector["inmemory"]+vector["ram"]+vector["real"]+vector["time"]+vector["analytics"]]

Signature(Structured)=[vector["structured"]+vector["olap"]+vector["sql"]+vector["data"]+vector["processing"]]

Signature(Business Apps)=[vector["oltp"]+vector["transactional"]+vector["crm"]+vector["erm"]+vector["hrm"]+vector["erp"]+vector["scm"]+vector["apps"]]

Signature(HPC)=[vector["high"]+vector["performance"]+vector["computing"]+vector["super"]+vector["computer"]+vector["parallel"]]

Signature(SDS)=[vector["software"]+vector["defined"]+vector["storage"]+vector["virtualization"]]

Signature(DC Virtualization)=[vector["datacenter"]+vector["virtualization"]+vector["enterprise"]]

Signature(VDI)=[vector["client"]+vector["virtualization"]]

Signature(Infrastructure)=[vector["develop"]+vector["test"]+vector["print"]+vector["file"]+vector["communicate"]+vector["share"]+vector["collaborate"]]]

Next, at step 930, the user accesses an application name or application type for which the workload type is to be identified. For example, a user may wish to identify a workload type for the application office available from Microsoft Corporation.

Next, at step 940, the user accesses the workload classification and analysis system 118 to identify a vector representation of application name using a previously generated neural network model. For example, the vector representation the application office available from Microsoft Corporation may be set forth as:

Vector ("ms office").

Next, at step 950 the workload classification and analysis system 118 calculates a vector similarity score between the vector representation of application name and each of the workload signatures. In this particular example, the similarity scores might be:

Similarity between Signature(Business Apps) & Vector (ms office)=0.505

Similarity between Signature(Structured) & Vector (ms office)=0.452

Similarity between Signature(InMemory) & Vector (ms office)=0.368

Similarity between Signature(Big Data) & Vector (ms office)=0.344

Similarity between Signature(HPC) & Vector (ms office)= 0.336

Similarity between Signature(VDI) & Vector (ms office)= 0.324

Similarity between Signature(SDS) & Vector (ms office)= 0.317

Similarity between Signature(DC Virtualization) & Vector (ms office)=0.316

Similarity between Signature(Infrastructure) & Vector (ms office)=0.0

Next, at step 960, the workload classification and analysis system 118 assigns the workload with the highest similarity score to the application name. In this case the workload type for "ms office" is "Business Apps" due to highest similarity score of 0.505.

Figure 10:
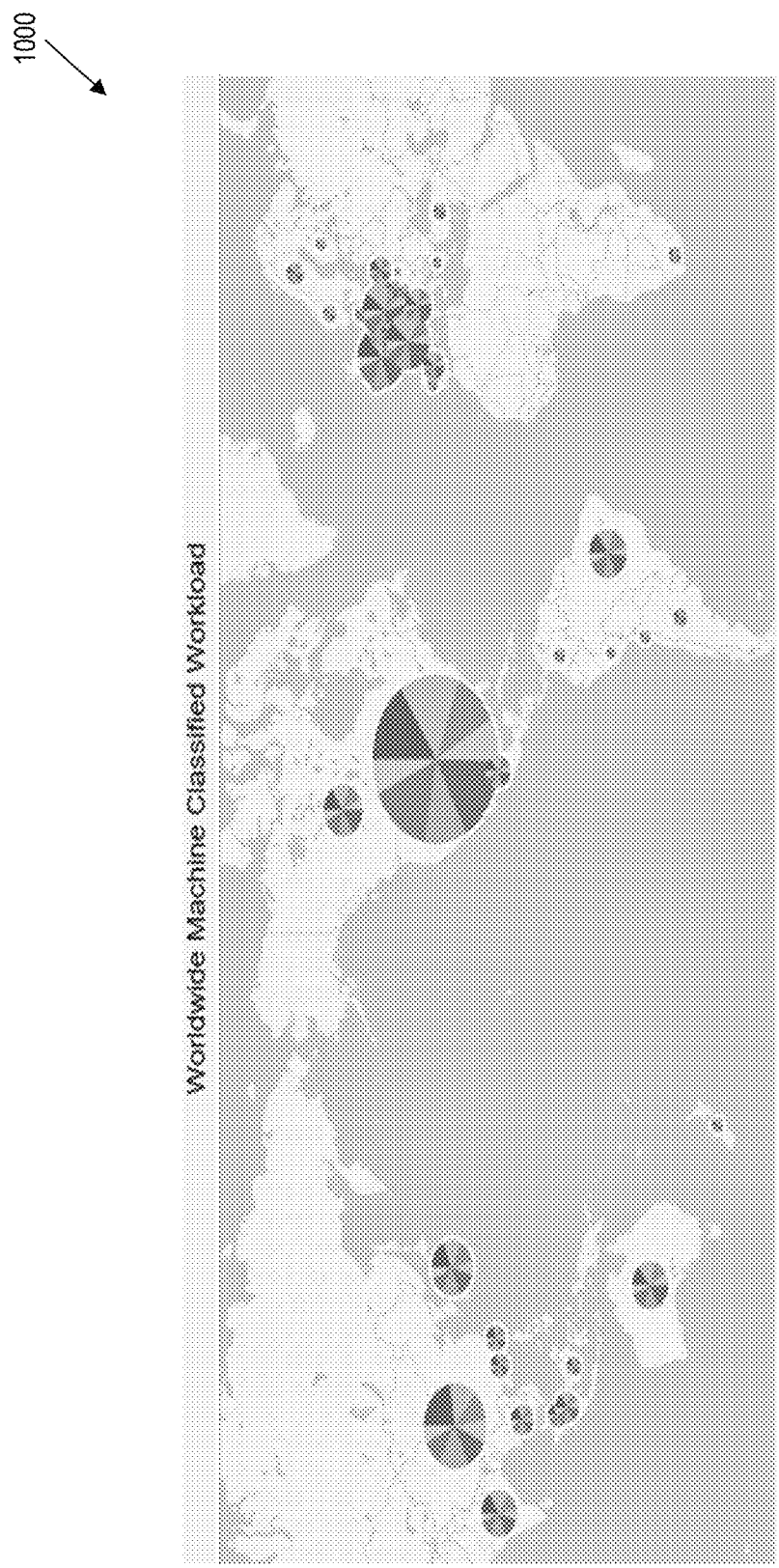
FIG. 10 shows an example workload classification and analysis user interface.

Referring to FIG. 10, an example workload classification and analysis user interface 1000 is shown. More specifically, the example workload classification and analysis user interface 1000 provides information regarding a worldwide view of a machine classified workload. In the example workload classification and analysis user interface 1000, various size circles are used to represent orders of magnitude of the machine classified workload for various geographic locations.

Figure 11:
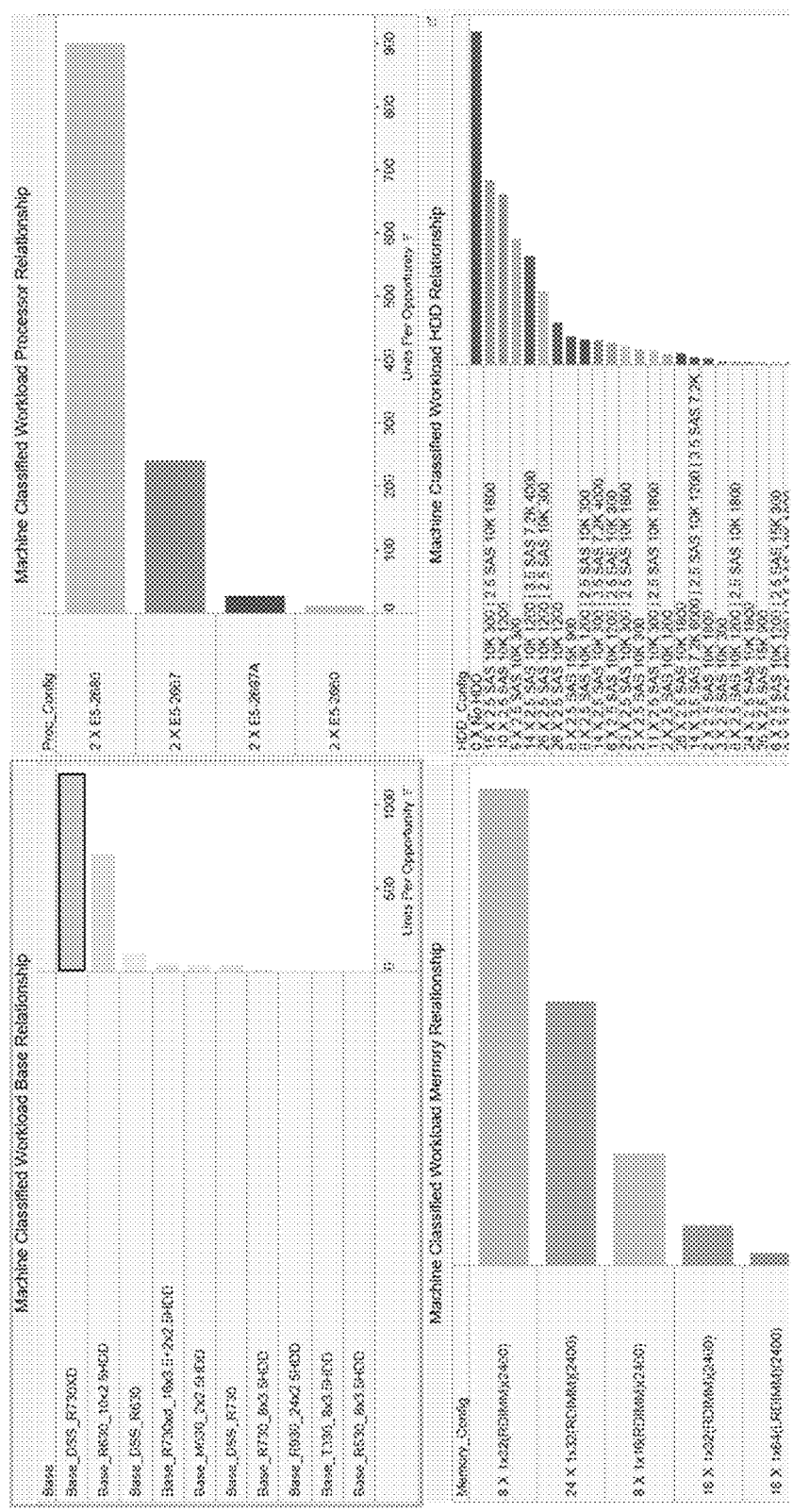
FIG. 11 shows another example workload classification and analysis user interface.

Referring to FIG. 11, an example workload classification and analysis user interface 1100 is shown. More specifically, the example workload classification and analysis user interface 1100 provides information regarding a plurality of workload classification metrics. More specifically, the workload classification and analysis user interface 1100 presents information regarding a machine classified workload base relationship metric, a machine classified workload processor relationship metric, a machine classified workload memory relationship and a machine classified workload disk drive relationship metric.

Figure 12:
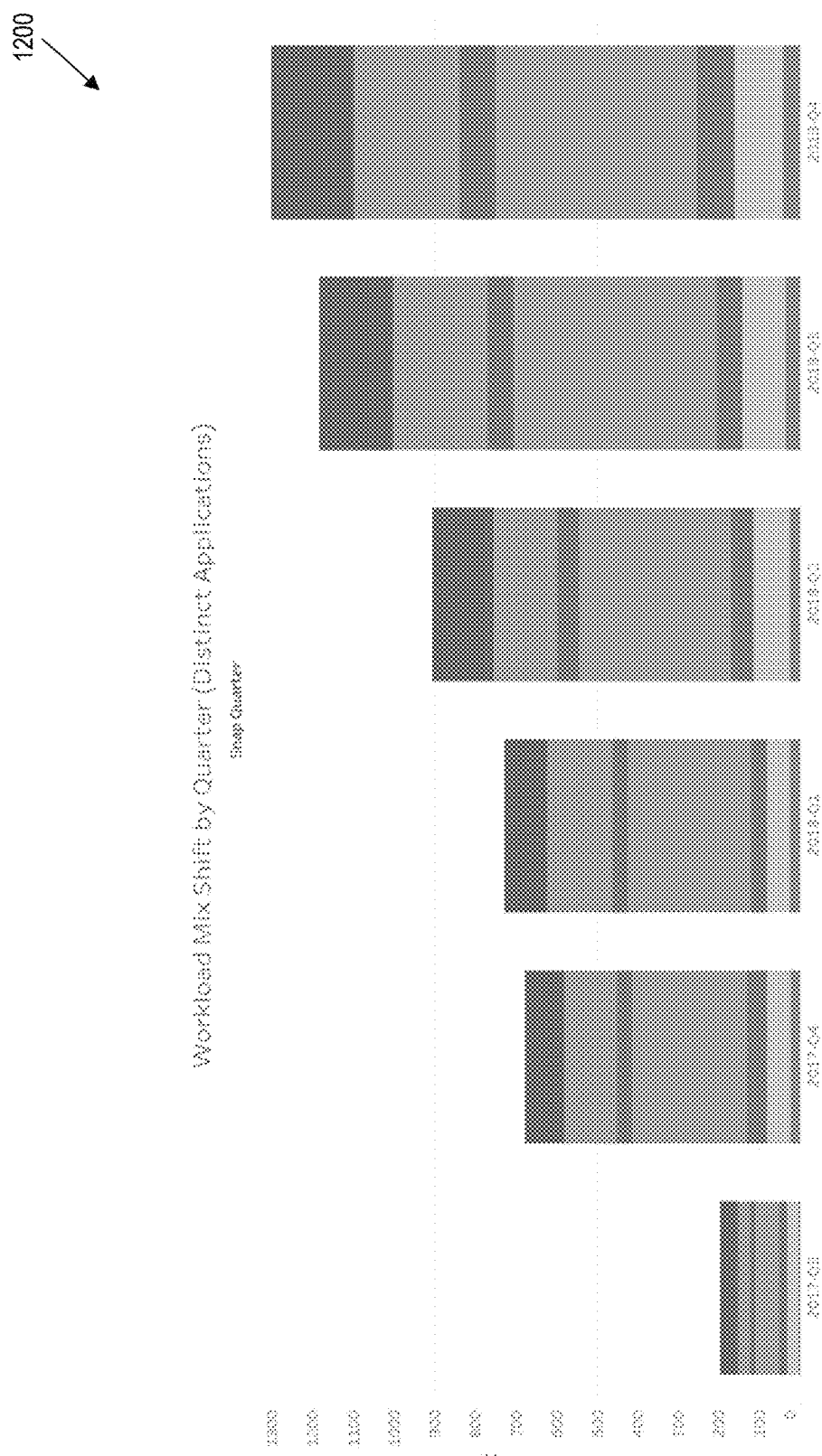
FIG. 12 shows another example workload classification and analysis user interface.

Referring to FIG. 12, an example workload classification and analysis user interface 1200 is shown. More specifically, the example workload classification and analysis user interface 1200 provides information regarding a workload mix by periods of time. More specifically, the example workload classification and analysis user interface 1200 provides information regarding a workload mix shift by quarter for distinct applications.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Python, Java, Smalltalk, C++ or the like. However, the computer program code for carrying out operations of the present invention may also be written in conventional procedural programming languages, such as the "C" programming language or 'R' and similar programming languages. The operations of the present invention can also be implemented using software packages such as SAS, IBM Watson or software packages which support Machine Learning algorithms. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a workload classification and analysis operation within an information technology (IT) infrastructure, comprising:
    receiving workload data from a data source, the data source comprising an information handling system executing within the IT infrastructure;
    generating a neural network model from the workload data via a workload classification and analysis system, the workload classification and analysis system performing the workload classification and analysis operation, the workload classification and analysis operation automatically classifying workloads executing on the information handling system within the IT infrastructure;
    defining a plurality of workload signatures via the workload classification and analysis system, the plurality of workload signatures defining a set of characteristics associated with a particular type of workload at a particular point in time;
    identifying particular workloads using the plurality of workload signatures and the neural network model via the workload classification and analysis system, the particular workloads corresponding to respective kinds of applications executing on the information handling system executing within the IT infrastructure; and,
    providing information regarding the particular workloads to a user, the information being provided by the workload classification and analysis system and being presented via a workload classification user interface of a user device.

2. The method of claim 1, further comprising:
performing a similarity scoring operation to generate a similarity score on identified component details; and,
ranking the list of workload signatures based upon the similarity score.

3. The method of claim 1, wherein:
the data source comprises an external unstructured data source.

4. The method of claim 1, wherein:
the data source comprises an internal data source.

5. The method of claim 1, wherein:
the neural network model comprises a doc2vec type neural network model.

6. The method of claim 1, wherein:
the doc2vec type neural network model comprises a distributed bag of words type doc2vec model.

7. A system comprising:
a processor;
a data bus coupled to the processor; and
a non-transitory, computer-readable storage medium embodying computer program for performing a workload classification and analysis operation within an information technology (IT) infrastructure code, the non-transitory, computer-readable storage medium being coupled to the data bus, the computer program code interacting with a plurality of computer operations and comprising instructions executable by the processor and configured for:

receiving workload data from a data source, the data source comprising an information handling system executing within the IT infrastructure;

generating a neural network model from the workload data via a workload classification and analysis system, the workload classification and analysis system performing the workload classification and analysis operation, the workload classification and analysis operation automatically classifying workloads executing on the information handling system within the IT infrastructure;

defining a plurality of workload signatures via the workload classification and analysis system, the plurality of workload signatures defining a set of characteristics associated with a particular type of workload at a particular point in time;

identifying particular workloads using the plurality of workload signatures and the neural network model via the workload classification and analysis system, the particular workloads corresponding to respective kinds of applications executing on information handling system executing within the IT infrastructure; and, providing information regarding the particular workloads to a user, the information being provided by the workload classification and analysis system and being presented via a workload classification user interface of a user device.

8. The system of claim 7, wherein the instructions executable by the processor are further configured for:
performing a similarity scoring operation to generate a similarity score on identified component details; and,
ranking the list of workload signatures based upon the similarity score.

9. The system of claim 7, wherein the instructions executable by the processor are further configured for:
the data source comprises an external unstructured data source.

10. The system of claim 7, wherein:
the data source comprises an internal data source.

11. The system of claim 7, wherein the instructions executable by the processor are further configured for:
the neural network model comprises a doc2vec type neural network model.

12. The system of claim 11, wherein:
the doc2vec type neural network model comprises a distributed bag of words type doc2vec model.

13. A non-transitory, computer-readable storage medium embodying computer program code for performing a workload classification and analysis operation within an information technology (IT) infrastructure, the computer program code comprising computer executable instructions configured for:
receiving workload data from a data source receiving workload data from a data source, the data source comprising an information handling system executing within the IT infrastructure;

generating a neural network model from the workload data via a workload classification and analysis system, the workload classification and analysis system performing the workload classification and analysis operation, the workload classification and analysis operation automatically classifying workloads executing on the information handling system within the IT infrastructure;

defining a plurality of workload signatures via the workload classification and analysis system, the plurality of workload signatures defining a set of characteristics associated with a particular type of workload at a particular point in time;

identifying particular workloads using the plurality of workload signatures and the neural network model via the workload classification and analysis system, the particular workloads corresponding to respective kinds of applications executing on information handling system executing within the IT infrastructure; and, providing information regarding the particular workloads to a user, the information being provided by the workload classification and analysis system and being presented via a workload classification user interface of a user device.

14. The non-transitory, computer-readable storage medium of claim 13, wherein the computer executable instructions are further configured for:
performing a similarity scoring operation to generate a similarity score; and,
ranking the list of workload signatures based upon the similarity score.

15. The non-transitory, computer-readable storage medium of claim 13, wherein the computer executable instructions are further configured for:
the data source comprises an external unstructured data source.

16. The non-transitory, computer-readable storage medium of claim 13, wherein the computer executable instructions are further configured for:
the data source comprises an internal data source.

17. The non-transitory, computer-readable storage medium of claim 13, wherein the computer executable instructions are further configured for:
the neural network model comprises a doc2vec type neural network model.

18. The non-transitory, computer-readable storage medium of claim 17, wherein:
the doc2vec type neural network model comprises a distributed bag of words type doc2vec model.

19. The non-transitory, computer-readable storage medium of claim 13, wherein:
the computer executable instructions are deployable to a client system from a server system at a remote location.

20. The non-transitory, computer-readable storage medium of claim 13, wherein:
the computer executable instructions are provided by a service provider to a user on an on-demand basis.

* * * * *